DEVICE IN HIGH VOLTAGE CONVERTER INSTALLATIONS INTENDED TO REDUCE DISTURBANCES IN TELECOMMUNICATION SYSTEMS

Filed Dec. 10, 1962

United States Patent Office 3,243,684

Patented Mar. 29, 1966

3,243,684

DEVICE IN HIGH VOLTAGE CONVERTER INSTALLATIONS INTENDED TO REDUCE DISTURBANCES IN TELECOMMUNICATION SYSTEMS

Åke Ekström and Lennart Faxö, Ludvika, Sweden, assignors to Allmanna Svenska Elektriska Aktiebolaget, Vasteras, Sweden, a Swedish corporation Filed Dec. 10, 1962, Ser. No. 243,431
Claims priority, application Sweden, Jan. 9, 1962, 186/62
5 Claims. (Cl. 321—9)

Figure 1:
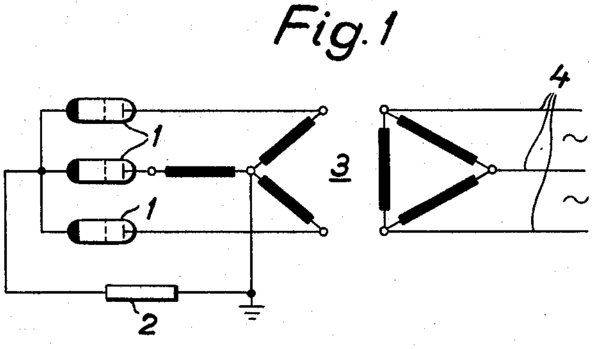

The present invention relates to a device in high voltage converter installations to reduce disturbances in telecommunication systems caused by voltage transients in the converter giving rise to tone frequency oscillations being transmitted by a polyphase A.C. transmission line connected to the converter station and transferred from the line to the telecommunication system.

The invention is based on the well-known principle that the voltage over a voltage source may be compensated in its entirety by connecting a second voltage source so that together they form a current circuit in which the total electromotive force is equal to the sum of the electromotive forces of the two voltage sources, and so that the electromotive force from each voltage source and the voltage drop over this voltage source cancel each other out.

It is known to effect smoothing of the voltage in a direct current network by using an amplifier, the input side and output side of which, each via its own capacitor is connected between the plus and minus sides of the network. A closed regulating system is thus obtained where the output side of the amplifier always has an electromotive force which is directed against the current which the alternating current components of the network voltage force through the impedance formed by the output impedance of the amplifier and said capacitor, and the voltage drop of this impedance is by the agency of the control system counteracted by the equally great electromotive force generated in the amplifier.

Further, it is known that in a similar manner it is possible to eliminate one or a smaller number of disturbing frequencies from a single-phase A.C. network by connecting the input side of the amplifier to the network via a filter which allows through only these frequencies.

For several reasons, the known devices cannot be used in connection with high voltage converter installations. To connect the amplifier between two and two of the different phases of the poly-phase winding would not, because of circumstances which will later be discussed in more detail, greatly reduce the disturbances. Further, such an arrangement can hardly be practically carried out. In any case, the necessary filters would be extremely complicated since the voltage on the poly-phase conductor of a high voltage rectifier equipment is extremely high, for example, 100,000 volts.

As known, an asymmetric poly-phase system may be resolved into a positive phase sequence system, a negative phase sequence system and a zero-phase sequence system.

Investigations carried out in connection with the development work from which the present invention has emanated have shown that disturbances in teleecommunication systems are nearly always caused by tone frequency currents mainly flowing along the same current path as the current of the zero-phase sequence system and which are mainly inductively being transmitted to the conductors of a telecommunication system. In the converter transformer, electrical fields will exist between parts belonging to different windings and having different potential. When the potential conditions of the rectifier winding are suddenly changed because of the ignition of an ionic valve, a change of the energy contained in the electric field between the two windings must take place. If each winding has some connection to earth, for instance in the form of earthed neutral points, a transport of electricity corresponding to the fluctuation of the electric field takes place, giving a current which mainly follows the same path through earth, and even in the A.C. transmission line, as the current of a possible zero-phase sequence system contained in the poly-phase system. The current caused by alterations of the electrical field between the transformer windings contains oscillations of tone frequency, which oscillations have a strong disturbing effect on tele-communication lines. A compensation device according to the invention is intended for counteracting these oscillations and not for smoothing the line voltage. By connecting the device to the circuit of the disturbing current, a similar connection is at the same time necessarily established between the device and the circuit of the zero-phase sequence system of the poly-phase system. However, this fact has not much influence on the dimensioning of the device, as the voltage of the zero-phase sequence system is very low.

Figure 2:
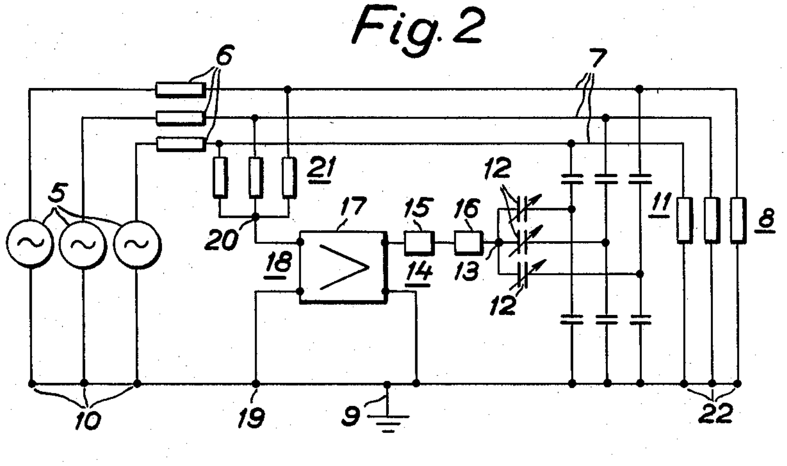

In the following the invention will be described with reference to the accompanying schematical drawing, where FIGURE 1 is a sketch showing the principles for a high voltage, three-prase, 3-pulse-rectifier equipment without any device for reducing the disturbances caused by it, and FIGURE 2 shows a circuit according to the invention.

In FIGURE 1, 1 designates controlled ionic valves connected to a direct current load 2. The converter transformer 3 has a Δ-connected line winding, and a Y-connected rectifier winding, that is, the phases are Δ-connected to the A.C. network 4 and Y-connected on the converter side. The neutral point of the rectifier winding is earthed. The ignition voltage in the ionic rectifiers 1 can be very high. Potential fluctuations of 150 kv. in connection with ignition and extinguishing of the rectifiers are not unusual. When a rectifier 1 has ignited, the voltage over the rectifier decreases steeply to a value near zero. The voltage jump is capacitively transmitted to the Δ-connected side of the transformer 3 and here gives rise to tone frequency voltages in the zero-phase sequence system of the three-phase line which have quite a considerable influence from a disturbance point of view. Through the capacitance of the poly-phase line itself to earth and through (possibly earthed) zero-points in the connected load, the disturbing tone frequency currents from the line winding of the transformer flows to earth and then along a path through earth back to the earthed neutral point of the rectifier winding of the transformer.

FIGURE 2 schematically shows a circuit in which a disturbing current occurs due to alterations in the electric field between the rectifier winding and the line winding of the converter transformer. The three conductors between the impedance groups 6 and 8 in FIGURE 2 are identical with the poly-phase line 4 in FIGURE 1, so that FIGURE 2 also shows how a device according to the invention is actually connected to the poly-phase line and to earth.

In FIGURE 2 voltage alterations in the electrical field between the rectifier winding and the line winding of the converter transformer occurring upon an ignition are symbolized by the generator symbols 5, and the capacitances through which the fluctuations are transferred from the rectifier winding to the line winding are symbolized by the impedance symbols 6 connected in series with each phase of the three phase line 4 in FIGURE 1. Thus, from a disturbance point of view, a converter together with an A.C. line to which a compensating device according to the invention is connected, can be regarded as equivalent to the system shown in FIGURE 2. In this system the disturbing current flows from the source of electromotoric power 5, through mainly capacitive impedances 6, through the A.C. transmission line 7, through earthed neutral points of the load 8, and/or line capacitances to earth 9.

The voltages on the line 7 with the load 8 are sensed by the capacitive voltage divider 11, to which three adjustable star-connected capacitors 12 are connected. In this way a star-point 13 is obtained between which star-point and earth the input 14 of an electronic amplifier is connected in series with two filters 15 and 16. The voltage divider 11 reduces the input voltage to the amplifier 17 to a suitable level.

The current of zero-phase sequence system, that is, the normal zero-phase circuit current as well as the current giving rise to disturbances, as mentioned, flow through earth. Unavoidable differences between the three phases of the voltage divider 11 regarding the rate of voltage dividing are evened out by adjusting the capacitors 12 so that the point 13 retains its character of neutral point with respect to the symmetrical components of the line voltage. Certain deviations as regards adjustment and operation, however, cannot be avoided and a sharply tuned blocking filter 15 for the base tone of the network frequency is therefore connected in front of the amplifier input 14. It is further desirable that certain frequencies of the zero-phase sequence voltage, being only slightly disturbing for the telecommunication, are prevented from being led in on the input side of the amplifier and thus loading it. Even a sharp blocking filter 16, toned for the third harmonic of the network frequency is therefore inserted before the amplifier input 14.

The voltage over the input 14 is amplified in the amplifier 17. The voltage from the output 18 is led in between earth 19 and the star-point 20 for three Y-connected impedances 21, for example capacitors, connected to the line 7.

The frequency characteristic of the amplifier is chosen so that as great an amplification as possible is obtained in the frequency range where the tele-network is most sensitive for disturbing voltages, i.e., so that the maximum amplification frequency in the closed control system coincides with the maximum for the psophometric sensitivity curve of the tele-network.

We claim:

1. In a high voltage converter installation comprising a poly-phase transformer with a rectifier winding connected to controlled ionic valves and a line winding connected to a poly-phase line a device for reducing disturbances in telecommunication systems, said device comprising a first and a second group of impedance elements, an amplifier with two input terminals and two output terminals, each of said groups being Y-connected to said poly-phase line, the neutral points of said first group being connected to one of said input terminals and the neutral point of said second group being connected to one of said output terminals, and the remaining amplifier terminals being connected to earth.

2. Device according to claim 1 in which the Y-connected branch in said first Y-connected group is connected to earth by means of corresponding earthing impedance elements, at least one part of each branch in said first group lying between the poly-phase line and the connecting point between said first group and said earthing impedance element.

3. Device according to claim 1, in which a blocking filter tuned for the base harmonic of the normal network frequency is connected in series with the input side of the amplifier.

4. Device according to claim 3, in which a blocking filter tuned for the third harmonic of the network frequency is also connected in series with the input side of the amplifier.

5. Device according to claim 1, in which the frequency characteristic of said amplifier is chosen in such a way that the amplification maximum for the control system in which the amplifier is included coincides with the maximum for the psophometric sensitivity curve of the protected telecommunication system.

References Cited by the Examiner

UNITED STATES PATENTS

| | | | |
|---|---|---|---|
| 1,645,174 | 10/1927 | Wilson | 330—149 X |
| 1,873,952 | 8/1932 | Aubort | 321—10 |
| 2,758,286 | 8/1956 | Wible | 333—76 |
| 3,047,804 | 7/1962 | Peer et al. | 330—149 X |

LLOYD McCOLLUM, *Primary Examiner.*

G. J. BUDOCK, J. C. SQUILLARO, W. H. BEHA, *Assistant Examiners.*